Oct. 20, 1942.  A. O. LA DUCER  2,299,153
SUPPORTING CLAMP FOR MOUNTING FITTINGS IN CONDUITS
Filed June 28, 1941
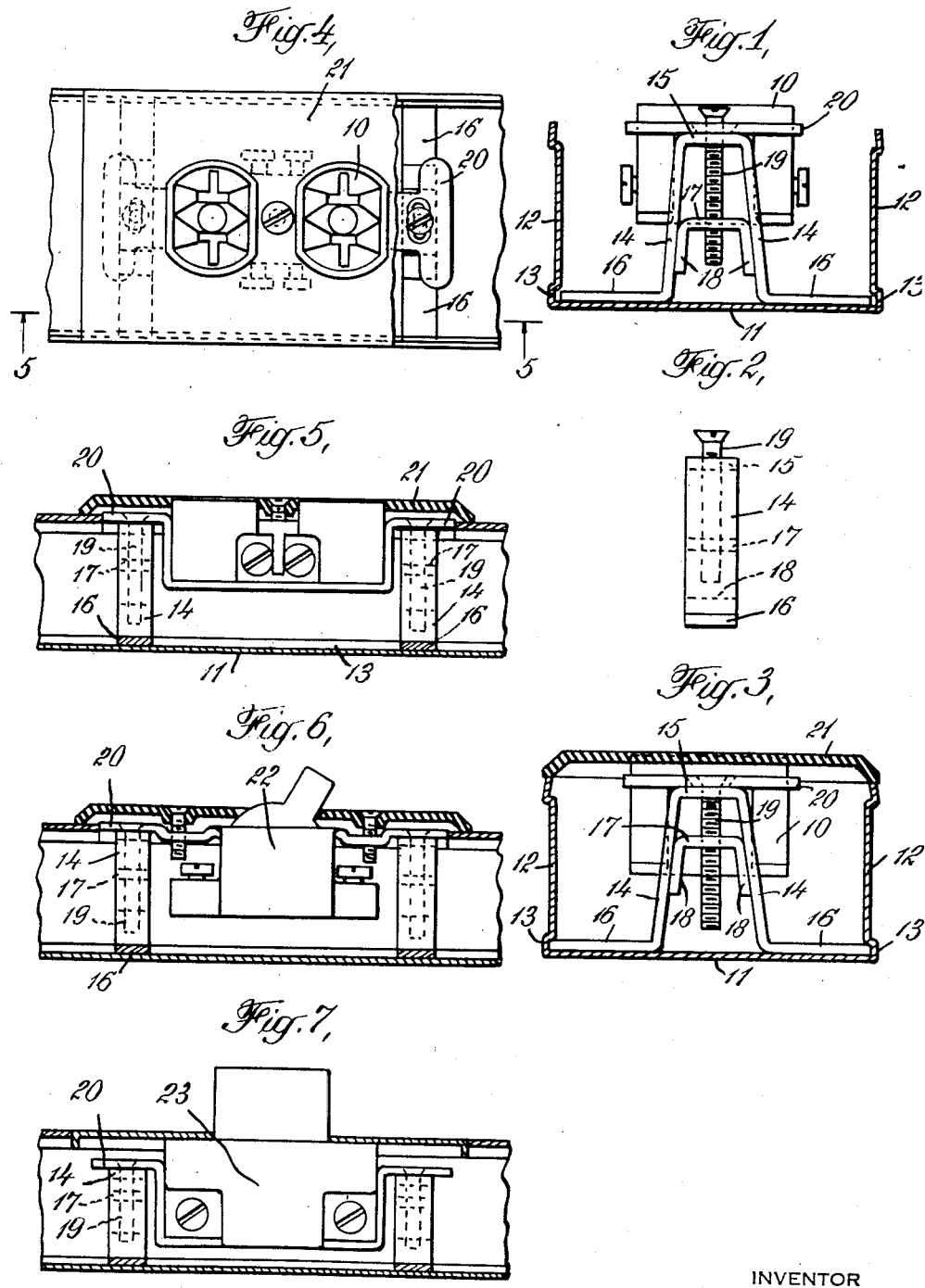
INVENTOR
Arthur O. LaDucer
BY
ATTORNEYS Patented Oct. 20, 1942

2,299,153

UNITED STATES PATENT OFFICE 2,299,153

SUPPORTING CLAMP FOR MOUNTING FITTINGS IN CONDUITS

Arthur O. La Ducer, West Hartford, Conn., assignor to The Wiremold Company, a corporation of Connecticut Application June 28, 1941, Serial No. 400,202

3 Claims. (Cl. 174—52)

This invention provides an improved clamp especially suited for securing electrical fittings, such as outlets, switches, and the like, in conduits. The new clamp is easy and economical to manufacture and use. It may be employed for securing various types of designs of electrical fittings in conduits of different sorts, but it is particularly suitable for securing fittings and the like in conduits having side walls formed with a pair of oppositely disposed longitudinal internal grooves.

The new clamp comprises a generally U-shaped clamp body having spreadable legs connected by a bar adapted to receive and support a fitting mounting bracket. Leg-expanding means, advantageously in the form of a nut, are arranged between the spreadable legs, and screw means are arranged to clamp a fitting bracket or other part to be mounted to the bar, and at the same time to actuate the leg-expanding means to spread apart the clamp legs, whereby the clamp legs may be tightly wedged against conduit side walls or other supporting structure.

Advantageously the clamp legs and bar are formed integrally, with the legs being gradually divergent and with the extremities of the legs being bent outwardly for engagement in oppositely disposed grooves in the side walls of a conduit. The bar advantageously is formed with an aperture through which a screw extends into threaded engagement with the leg-expanding nut, whereby when the screw is tightened a fitting bracket may be clamped between the screw head and the clamp bar, and at the same time the clamp legs are spread apart and may be wedged tightly in the conduit grooves.

The invention will be better understood from the following description, considered in conjunction with the accompanying drawing, in which Fig. 1 is a cross section through a wiring channel in which an outlet fitting is about to be mounted by the new clamp;

Fig. 2 is a side view of the clamp shown in Fig. 1;

Fig. 3 is a cross section through the channel shown in Fig. 1 after completion of the mounting of the outlet fitting;

Fig. 4 is a plan view of the outlet fitting mounted as shown in Fig. 3;

Fig. 5 is a longitudinal section taken substantially along the line 5—5 of Fig. 4; and Figs. 6 and 7 are longitudinal sections similar to Fig. 5 but showing respectively a switch and a twistlock receptacle mounted in a channel by the new clamp.

As shown in Fig. 1, an outlet fitting 10 is about to be mounted by the new clamp in a channel-shaped wiring conduit having a bottom wall 11 and side walls 12. The side walls 12 are bulged outwardly adjacent the bottom wall 11 to form narrow longitudinally extending oppositely disposed internal grooves 13.

The clamp by which the fitting 10 is about to be mounted in the conduit comprises a generally U-shaped body having gradually divergent legs 14 connected by a bar 15. The extremities 16 of the legs of the U-shaped member are bent outwardly so that they may engage in the oppositely disposed grooves 13 in the conduit side walls. The generally U-shaped clamp body, configured as described, may readily be formed integrally by suitably bending a strip of steel or other metal.

Mounted between the gradually divergent legs 14 of the U-shaped member are expanding means in the form of a nut 17. The nut 17, as shown in the drawing, is a generally U-shaped piece formed with legs 18 bearing against the inner surfaces of the gradually divergent legs 14 of the clamp body. A screw 19 passes freely through an aperture formed in the bar 15 of the clamp body and into threaded engagement with a correspondingly threaded aperture in the nut 17.

In order to fasten the fitting 10 in the conduit, the screw 19 has been passed through an opening formed in a mounting bracket 20 attached to the fitting, and this mounting bracket rests on the bar 15 of the clamp body. With the fitting and clamp thus in position (as shown in Fig. 1), the screw 19 is turned down tightly to secure the fitting in the conduit. As the screw 19 is turned down, the nut 17 is drawn up between the gradually divergent legs 14 of the clamp body. As a result, the legs 14 of the clamp body are caused to diverge further, and the outwardly bent extremities 16 of the clamp body legs are forced tightly into the grooves 13 of the conduit side walls. At the same time the head of the screw 19 seats tightly against the fitting bracket 20, thus securing the fitting tightly to the clamp. Thus the fitting is well-secured to the clamp, and the clamp in turn is tightly wedged in the channel. Thereafter the fitting cover 21 may be mounted on the fitting in the usual manner.

The outlet fitting mounted in the conduit as above described is shown in Figs. 3 to 5. Figs. 6 and 7 show respectively a switch 22 and a twistlock receptacle 23 mounted in a conduit in the same manner as the outlet fitting of Figs.

1, 3, 4 and 5 means of the above-described clamp. Each of the fittings, as shown in the drawing, is mounted by means of two clamps, one at either end of the fitting. A single clamp of the character described, however, may be employed for mounting fittings having only one mounting bracket.

The new clamp is advantageously constructed in the manner described above, for in this form it is easily and inexpensively manufactured almost wholly by stamping operations. It is understood, however, that various modifications may be made in the clamp structure, and its form may be modified to adapt it for use in other environments, such as in conduits of modified design.

I claim:

1. The combination comprising a wiring conduit having side walls formed with a pair of oppositely disposed longitudinal internal grooves, a fitting mounted in said conduit, and mounting means securing the fitting and the conduit together comprising a generally U-shaped integral clamp body having gradually divergent legs connected by a bar, the extremities of said legs being bent outwardly and engaging in the oppositely disposed grooves in the conduit side walls, leg-expanding means arranged between the gradually divergent legs, and screw means engaging with the fitting and also with the leg expanding means in such manner as to hold the fitting securely against the clamp bar and to hold the leg-expanding means drawn up between the clamp legs so that said legs are wedged tightly in the conduit grooves.

2. The combination comprising a wiring conduit having side walls formed with a pair of oppositely disposed longitudinal internal grooves, a fitting mounted in said conduit, and clamp means securing the fitting to the conduit comprising spreadable clamp legs engaging in the conduit grooves, a clamp bar connecting said legs together and engaging with the fitting, leg-expanding means arranged between the spreadable legs, and screw means securing the fitting to the clamp bar and also engaging the leg-expanding means in such manner as to hold said means in leg-expanded position wedging the clamp legs securely in the conduit grooves.

3. The combination comprising a wiring conduit having side walls formed with a pair of oppositely disposed longitudinal internal grooves, a fitting mounted in said conduit, and means securing said fitting and said conduit together comprising a generally U-shaped integral clamp body having gradually divergent legs connected by a bar, the extremities of said legs being bent outwardly and engaging in the oppositely disposed grooves in the conduit side walls, a leg-expanding nut arranged between the gradually divergent legs, and a screw engaging with the fitting and passing through an aperture in the bar into threaded engagement with said nut in such manner as to hold the fitting securely to the bar and to hold the leg-expanding means drawn up between the clamp legs so that said legs are wedged tightly in the grooves in the conduit side walls.

ARTHUR O. LA DUCER.

CERTIFICATE OF CORRECTION.

Patent No. 2,299,153.   October 20, 1942.

ARTHUR O. LA DUCER.

It is hereby certified that error appears in the printed specification of the above numbered patent requiring correction as follows: Page 1, first column, line 6, for "types of" read --types and--; page 2, first column, line 1, before "means" insert --by--; and that the said Letters Patent should be read with this correction therein that the same may conform to the record of the case in the Patent Office.

Signed and sealed this 24th day of November, A. D. 1942.

Henry Van Arsdale,
Acting Commissioner of Patents.

(Seal)